UNITED STATES PATENT OFFICE.

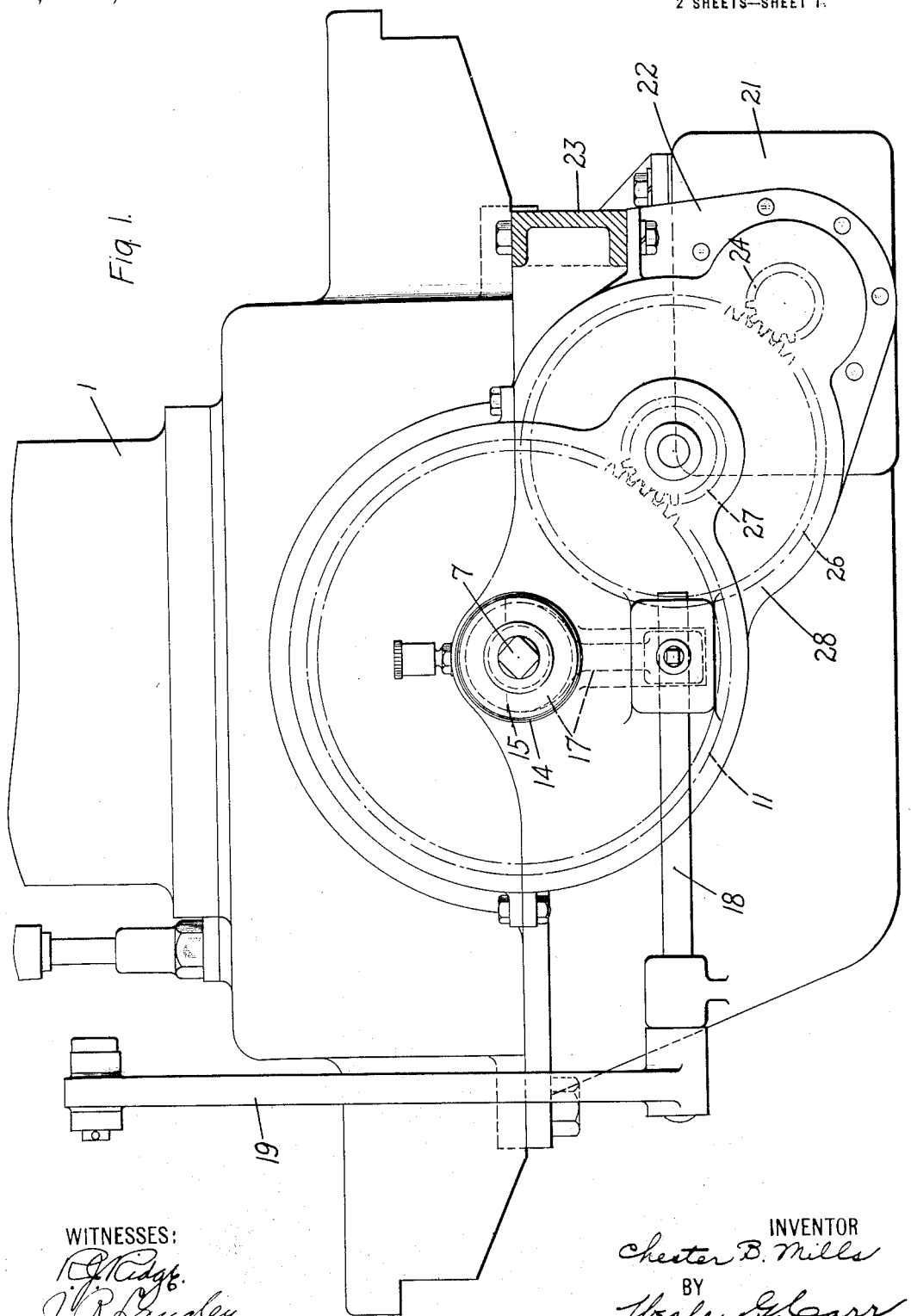

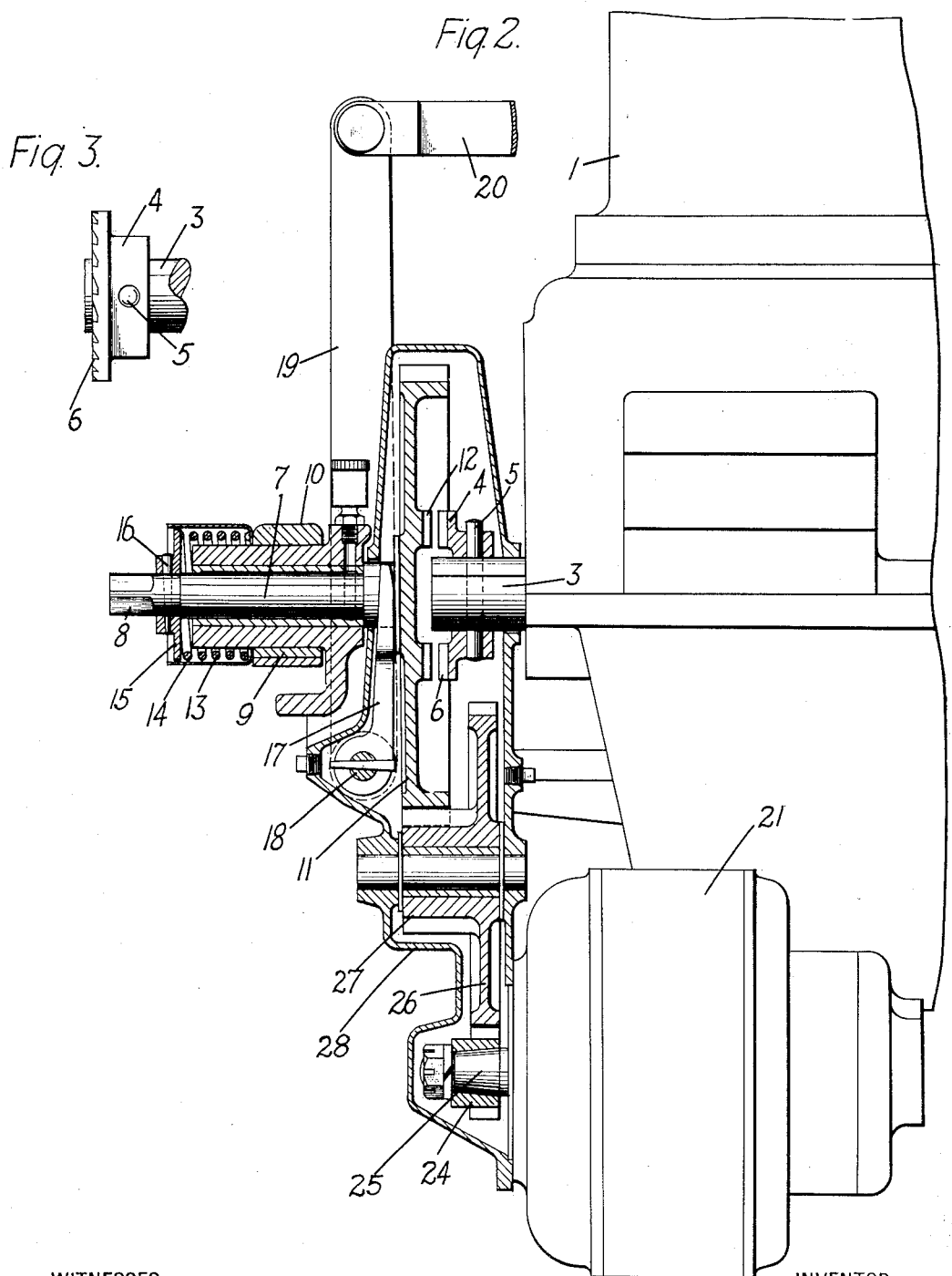

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

STARTING DEVICE FOR AUTOMOBILES.

1,164,006. Specification of Letters Patent. Patented Dec. 14, 1915.

Application filed March 7, 1913. Serial No. 752,616.

*To all whom it may concern:*

Be it known that I, CHESTER B. MILLS, a citizen of the United States, and a resident of East McKeesport, in the county of Allegheny and State of Pennsylvania, have invented a new and useful Improvement in Starting Devices for Automobiles, of which the following is a specification.

My invention relates to starting devices for automobiles and particularly to starting devices in which electric motors are employed.

The object of my invention is to provide a simple and convenient means for connecting the motor to the engine shaft which avoids any possibility of damage to the mechanism in case the operator attempts to make the connection when the engine is in operation.

It is common practice to connect the starting motor to the engine shaft by means of reduction gear mechanism. When this construction is employed, the fly wheel of the engine is usually provided with gear teeth and a pinion which is connected to the starting motor is meshed with the fly wheel gear in starting. The diameter of the fly wheel is relatively large and the peripheral speed is high when the engine is operating under its own power. An objection to this form of connection is the possibility that the operator, by accident or mistake, may connect the motor when the engine is running and the teeth of the gears will be broken as a result. This accident cannot occur in a device constructed in accordance with my invention as I employ a ratchet clutch, or other suitable one-way clutch, between the gearing and the engine shaft, which cannot engage when the engine is running. The necessity for an interlock of any kind between the motor and the engine shaft is thus avoided.

My invention will be understood in connection with the drawings in which—

Figure 1 is an end view, partially in section, of a starting motor and the engine of an automobile. Fig 2 is a side elevation with the gears in section. Fig. 3 is a detail view of a clutch.

The front portion of an engine of an automobile is shown at 1, the remainder being broken away. Upon the front end of the crank shaft 3, is a clutch member 4 fastened thereon by a pin 5 and provided with ratchet teeth 6. A starting shaft 7, adapted at 8 for engagement by the usual hand crank, is rotatably and slidably mounted in a bearing 9 supported by a frame member 10 of an automobile and is in alinement with the crank shaft 3. A gear wheel 11 is rigidly mounted on the shaft 7 and has upon its inner face a series of ratchet clutch teeth 12, which co-act with the teeth 6 on the clutch member 4. Normally, the shaft 7 is held in its outward position, as shown in Fig. 2, by a compression spring 13, which, at one end, is retained by the end of a casing 14 and, at the other end, engages a collar 15 that is connected to the shaft 7 by a pin 16. The shaft 7 is reciprocated to effect engagement of the clutch members by a yoke member 17 fixed on a rock shaft 18 which is actuated by a crank 19 attached by a rod 20 to a hand lever or foot pedal, not shown.

An electric motor 21 is fastened by a bracket 22 to a channel beam 23 which is attached to the crank case of the engine in any suitable manner. A pinion 24 is fixed on the motor shaft 25 and meshes with an idler gear wheel 26 which is integral with a pinion 27 having sufficient length to mesh with the gear wheel 11 at all times. A casing 28 incloses the gear train and the front of the motor and acts as a support for the gear wheel 26.

When it is desired to start the engine, the operator actuates a lever or pedal, not shown, to rock the shaft 18. The yoke 17, presses against the hub of gear wheel 11 and reciprocates the shaft 7 to effect engagement of the clutch teeth 6 and 12. The motor is then operated, through any suitable electrical connections, to start the engine. When the latter operates under its own power at a speed greater than that of the gear wheel 11, the clutch member 4 will overrun the clutch teeth 12 and the gear wheel 11 will be thrown outward by the cam action of the inclined teeth. The gear 11 is held in its disengaged position by the spring 13.

In case the operator inadvertently presses the starting lever or pedal when the engine is running, no harm can result because the clutches cannot engage, the inclined surface of the teeth 6 simply sliding over the teeth 12.

If desired, the engine may be started by the usual hand crank by pressing the shaft 7 inwardly until the clutch members engage. The gear wheel 11 remains in mesh with the pinion 27 and the armature of the motor is rotated by means of the reduction gearing. This is an advantage, as the armature, while it offers little resistance to rotation with its circuit open, has a fly wheel effect and aids in starting the engine.

I claim as my invention:—

1. In combination, an engine shaft, a slidably mounted starting shaft in alinement therewith adapted for engagement by manually operable means, a clutch member on said engine shaft, a gear wheel fixed on said starting shaft and adapted to engage said clutch member, a motor, and reduction gearing operatively connecting said motor to said gear wheel.

2. In combination, an engine shaft, a clutch member fixed thereon, a slidably mounted clutch member adapted to co-act with said first named clutch member, means for normally retaining the slidable clutch member in an inoperative position, a motor, and gearing for operatively connecting said motor to said slidable clutch member.

3. In combination, an engine shaft, a starting shaft slidably and rotatably mounted in alinement with said engine shaft, a clutch member on said engine shaft, a clutch member on said starting shaft adapted to co-operate with the first named clutch member, means for yieldingly separating said clutch members, and a motor operatively connected to said starting shaft.

4. In combination, an engine shaft, a slidably mounted starting shaft in alinement therewith and adapted to engage the same, means for yieldingly retaining said starting shaft in a disengaged position, means for reciprocating said starting shaft, and a motor operatively connected to said starting shaft.

5. In combination, an engine shaft having a clutch member, a slidably mounted stub shaft in alinement with the engine shaft and having a coacting clutch member, means for actuating said stub shaft to effect the engagement of said clutch members, means for normally retaining said stub shaft in its disengaged position, a motor, and gear mechanism for operatively connecting said motor to said stub shaft.

6. In combination, an engine shaft, a slidably mounted starting shaft in alinement therewith and adapted for engagement by a hand crank, clutch members adapted to connect said shafts, means for reciprocating said starting shaft, means for retaining said starting shaft in disengaged position, and a motor operatively connected to said starting shaft.

7. In combination, an engine shaft, a member provided with means to engage said engine shaft and adapted to be rotated manually and mechanically, and mechanical means for rotating said shaft, said means being adapted to act as a fly wheel when said member is rotated manually.

8. In combination, an engine shaft, a starting shaft slidably mounted in alinement therewith and adapted to engage said engine shaft and to be engaged by the usual hand crank, means for reciprocating said starting shaft, and a motor operatively connected to said starting shaft at all times.

9. In combination, an engine shaft, a slidably mounted starting shaft adapted for engagement by a hand crank, coacting clutch members on said starting shaft and said engine shaft, and a starting motor adapted to act as a fly wheel when the starting shaft is manually operated.

In testimony whereof, I have hereunto subscribed my name this 27th day of February, 1913.

CHESTER B. MILLS.

Witnesses:
RAOUL TRUGGER,
B. B. HINES.